United States Patent
Andrä

(10) Patent No.: US 6,343,777 B1
(45) Date of Patent: Feb. 5, 2002

(54) SUSPENSION LUG FOR A SWINGING LOAD, ESPECIALLY AN EXHAUST SYSTEM OF A MOTOR VEHICLE

(75) Inventor: Rainer Andrä, Limburg (DE)

(73) Assignee: SGF Suddeutsche Gelenkscheibenfabrik GmbH & Co. KG (DE)

( * ) Notice: Subject to any disclaimer, the term of this patent is extended or adjusted under 35 U.S.C. 154(b) by 0 days.

(21) Appl. No.: 09/694,916

(22) Filed: Oct. 24, 2000

Related U.S. Application Data

(63) Continuation of application No. PCT/EP99/03850, filed on Jun. 2, 1999.

(30) Foreign Application Priority Data

Jun. 9, 1998 (DE) .......................................... 198 25 811

(51) Int. Cl.⁷ ................................................. F16M 13/00
(52) U.S. Cl. .......................... 248/610; 248/60; 267/152
(58) Field of Search .................. 248/610, 60; 180/309, 180/89.2; 267/152, 153

(56) References Cited

U.S. PATENT DOCUMENTS

| | | | |
|---|---|---|---|
| 3,977,486 A | 8/1976 | Kleinschmit ................. | 180/64 |
| 5,032,342 A | * 7/1991 | Drabing et al. | |
| 5,971,346 A | * 10/1999 | Monneau et al. ........... | 248/610 |
| 6,170,782 B1 | * 1/2001 | Barrier et al. ................ | 248/60 |

FOREIGN PATENT DOCUMENTS

| | | |
|---|---|---|
| DE | 3737987 | 5/1989 |
| EP | 0816734 | 1/1998 |

\* cited by examiner

*Primary Examiner*—Anita King
*Assistant Examiner*—Korie H. Chan
(74) *Attorney, Agent, or Firm*—Webb Ziesenheim Lodgson Orkin & Hanson, P.C.

(57) ABSTRACT

A suspension lug has a ring shaped elastomer body in which two fixing parts are arranged opposite each other, and a flexible insert shaped like a loop which is embedded in the elastomer body in such a way that it transmits tensile forces from one fixing part to the other when the suspension lug is subjected to tensile loading. At least one of the fixing parts has attachment areas on which the insert is hung in such a way that the insert extends essentially radially away from this fixing part. As a result, the structural height of the suspension lug is relatively small.

7 Claims, 2 Drawing Sheets

SUSPENSION LUG FOR A SWINGING LOAD, ESPECIALLY AN EXHAUST SYSTEM OF A MOTOR VEHICLE

CROSS-REFERENCE TO RELATED APPLICATIONS

This application is a continuation of International Patent Application Number PCT/EP99/03850, filed on Jun. 2, 1999, and designating inter alia, the United States, which claims priority to German Application No. 198 25 811.9, filed Jun. 9, 1998.

BACKGROUND OF THE INVENTION

1. Field of the Invention

The invention relates to a suspension lug for a swinging load, especially an exhaust system of a motor vehicle.

2. Description of the Prior Art

In a known suspension lug from German Reference No. DE 37 37 987 C2, the suspension lug includes two fixing parts in the form of cylindrical bushings, and further includes a flexible insert that is wound around both bushings. The flexible insert is wound around both bushings in such a way that it engages each one of them approximately in a semicircle and then extends tangentially away from them. Those areas of the insert in engagement with the outside of the bushings and those portions of the elastomer body in which the insert is embedded account for a considerable part of the total structural height of the suspension lug without making a corresponding contribution to the spring characteristics of the suspension lug.

It is, therefore, the object of the invention to devise a suspension lug for a swinging load, especially an exhaust system of a motor vehicle such that it requires little structural height at a given load carrying capacity and given spring characteristic.

SUMMARY OF THE INVENTION

This object is met by a suspension lug for a swinging load made in accordance with the present invention. The suspension lug includes a ring shaped elastomer body. In addition, the suspension lug includes two fixing parts arranged opposite each other in the elastomer body. Furthermore, the suspension lug includes a flexible insert in the form of a loop imbedded in the elastomer body in such a way that it transmits tensile forces from one fixing part to the other fixing part when the suspension lug is subjected to tensile loading. The fixing parts have attachment areas on which the insert is hung in such a way that the insert extends essentially radially away from this fixing part.

The insert may be crossed in a figure eight between the fixing parts. The fixing parts may each further include a pair of laterally positioned hook shaped attachment areas. The fixing parts may also be sleeves having a longitudinal slot that is between the attachment areas. In addition, the fixing parts may each have slots as attachment areas. The fixing parts may be T-shaped, and each include a prop. The prop may include the attachment areas and a threaded pin projecting at right angles from the middle of the prop.

BRIEF DESCRIPTION OF THE DRAWINGS

Embodiments of the invention will be described in greater detail below, with reference to the accompanying diagrammatic drawings.

DETAILED DESCRIPTION OF THE PREFERRED EMBODIMENTS

Figure 1:
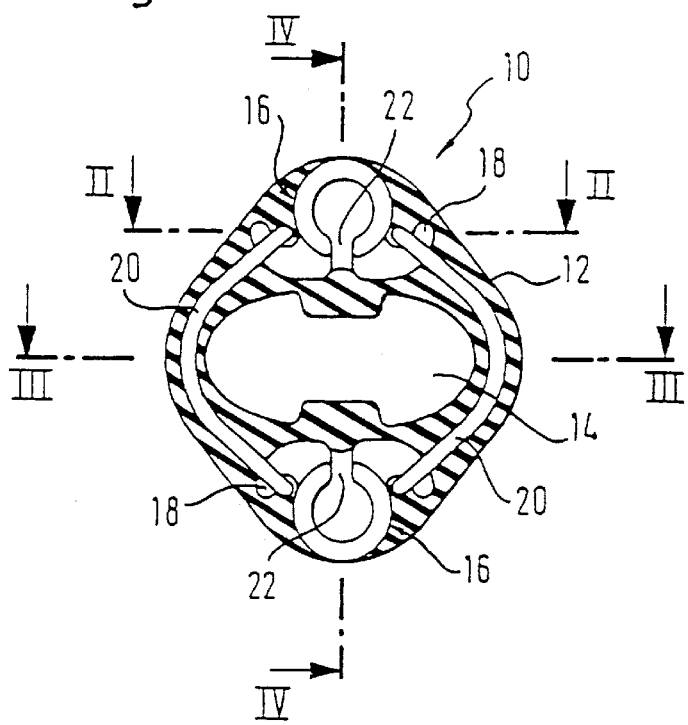
FIG. 1 shows a first embodiment of a suspension lug according to the invention in vertical section I—I of FIG. 4.
Figure 4:
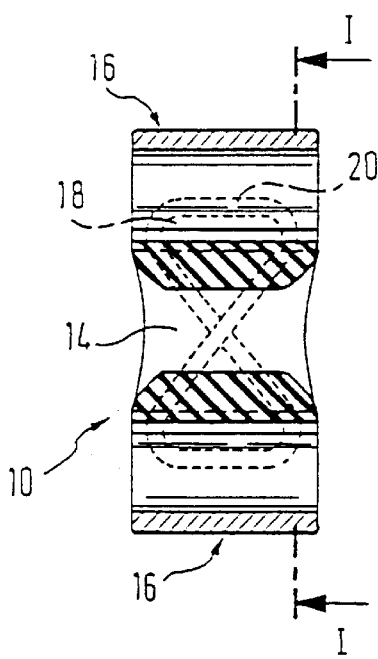
FIG. 4 is the vertical section IV—IV of FIG. 1.

The suspension lug illustrated in FIGS. 1 to 4 comprises a ring-shaped elastomer body 10 having an outer wall 12. As shown in the side elevation of FIG. 1, this wall is shaped like a square with rounded corners when the suspension lug is unloaded. The elastomer body 10 is shaped in mirror symmetry with respect to a plane which is horizontal when the suspension lug is arranged as usual, such as shown in FIG. 1, and with respect to a vertical plane. It has a central recess 14 essentially shaped like a lying oval. At the top and at the bottom, a fixing part 16 each is embedded in the elastomer body 10, especially by vulcanization, the fixing part 16 comprising attachment areas 18 for a flexible insert 20. The attachment areas 18 are designed and disposed laterally at the fixing parts 16 in such a way that they have no influence on the structural height of the suspension lug.

Figure 2:
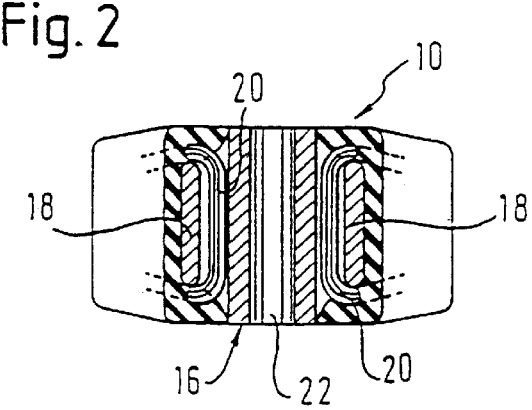
FIG. 2 is the horizontal section II—II of FIG. 1.
Figure 5:
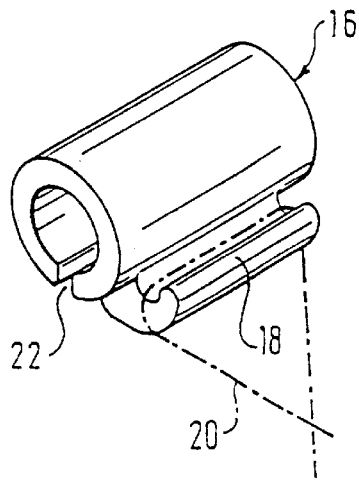
FIG. 5 shows a fixing part of the suspension lug of FIGS. 1 to 4 in perspective elevation.
Figure 3:
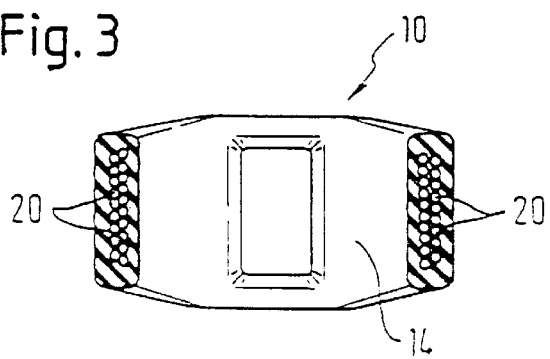
FIG. 3 is the horizontal section III—III of FIG. 1.
Figure 6:
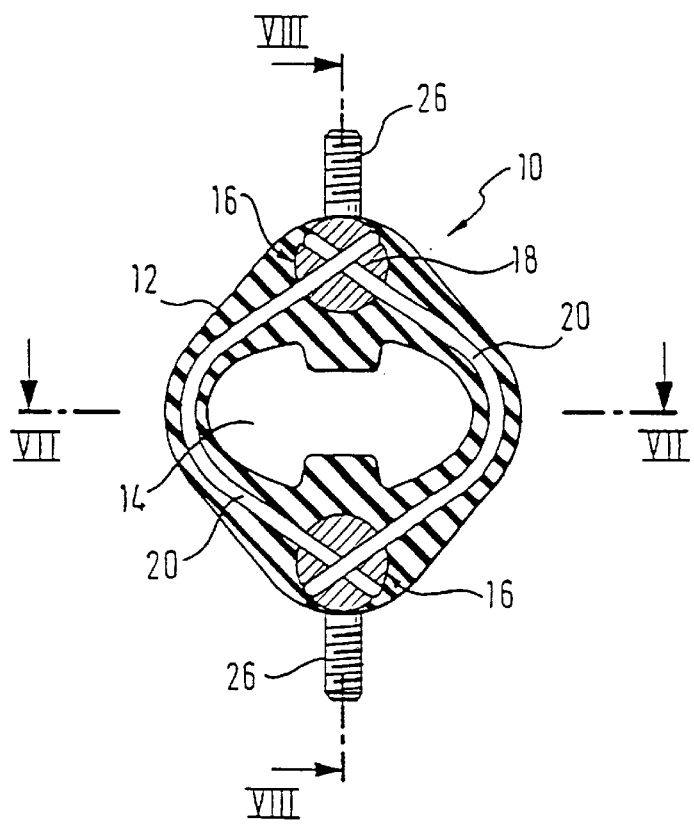
FIG. 6 shows a second embodiment of a suspension lug according to the invention, in vertical section VI—VI of FIG. 8.
Figure 8:
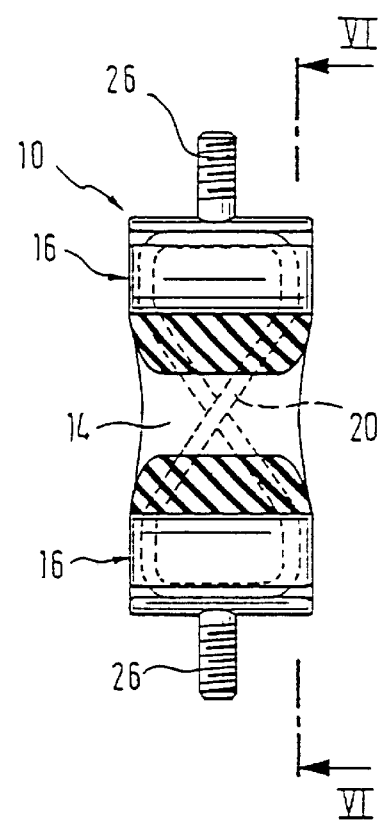
FIG. 8 is the vertical section VIII—VIII of FIG. 6.
Figure 9:
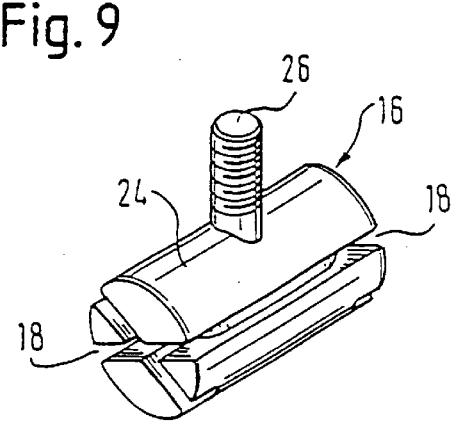
FIG. 9 shows a fixing part of the suspension lug of FIGS. 6 to 8 in perspective elevation.
Figure 7:
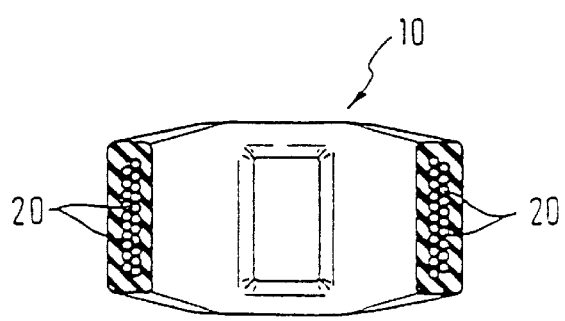
FIG. 7 is the horizontal section VII—VII of FIG. 6.

In the embodiment of the suspension lug according to FIGS. 1 to 3 the fixing parts 16 are sleeves and their attachment areas 18 are hooks which are oriented away from each other and separated from each other by a longitudinal slot 22. The insert 20 is embodied by two separate thread loops or coils each hung up on a respective one of the two attachment areas 18 of the upper and lower fixing parts 16 and extending approximately radially away from the fixing parts 16 between which they each are crossed in a figure of eight. The longitudinal slots 22 in the two fixing parts 16 face each other. The top of the upper fixing part 16 and the bottom of the lower fixing part 16 are smooth cylinder surfaces which either are exposed or covered by but a thin elastomer layer. In any case, the insert 20 does not surround them.

The suspension lug according to FIGS. 6 to 9 essentially differs from the one illustrated in FIGS. 1 to 5 in that the fixing parts 16 are T-shaped, comprising a solid, substantially cylindrical prop 24 each and a threaded pin 26 each, projecting at right angles from the middle of the prop 24. The threaded pins 26 protrude upwardly and downwardly, respectively, out of the elastomer body 10 for fastening to a corresponding mounting means, e.g. the bottom plate of a motor vehicle or an exhaust muffler. The attachment areas 18 for the insert 20, which again consists of two separate loops, are constituted by slots formed in the end faces and along a surface line each.

What both embodiments have in common is that the fixing parts 16 with their attachment areas 18 can be made of metal as compression molded articles or of plastics as injection molded articles. And loop packages of the kind conventional with flexible discs may be used as insert 20.

What is claimed is:

1. A suspension lug for a swinging load, comprising:
   a ring shaped elastomer body having a top and a bottom thereby defining an overall height;

a first fixing part and a second fixing part arranged opposite each other in the elastomer body at the top and at the bottom of the body respectively; and a flexible insert in the form of a loop embedded in the elastomer body in such a way that the flexible insert transmits tensile forces from one fixing part to the other fixing part when the suspension lug is subjected to tensile loading;

wherein at least one of the first or second fixing parts has attachment areas spaced away from the respective top or bottom of the body on which the insert is hung in such a way that the insert extends essentially radially away from this fixing part and in such a way that the height of the body is not increased by the insert.

2. The suspension lug as claimed in claim 1, wherein the insert is crossed in a figure eight between the fixing parts.

3. The suspension lug as claimed in claim 2, wherein the fixing parts each further include a pair of laterally positioned hook shaped attachment areas.

4. The suspension lug as claimed in claim 1, wherein the fixing parts each further include a pair of laterally positioned hook shaped attachment areas.

5. The suspension lug as claimed in claim 4, wherein the fixing parts are sleeves having a longitudinal slot between the attachment areas.

6. The suspension lug as claimed in claim 1, wherein the fixing parts each have slots as attachment areas.

7. The suspension lug as claimed in claim 6, wherein the fixing parts are T-shaped and each includes a prop, and wherein the prop comprises the attachment areas and a threaded pin projecting at right angles from a middle of the prop.

* * * * *